Jan. 28, 1964     W. A. HERPICH ETAL     3,119,503
MOTOR VEHICLE WITH PERMANENT AND SET-OFF BODIES
Filed Aug. 27, 1962     3 Sheets-Sheet 1

INVENTORS.
WILLIAM A. HERPICH
JOHN P. YOCHEM
BY Owen & Owen
ATTORNEYS

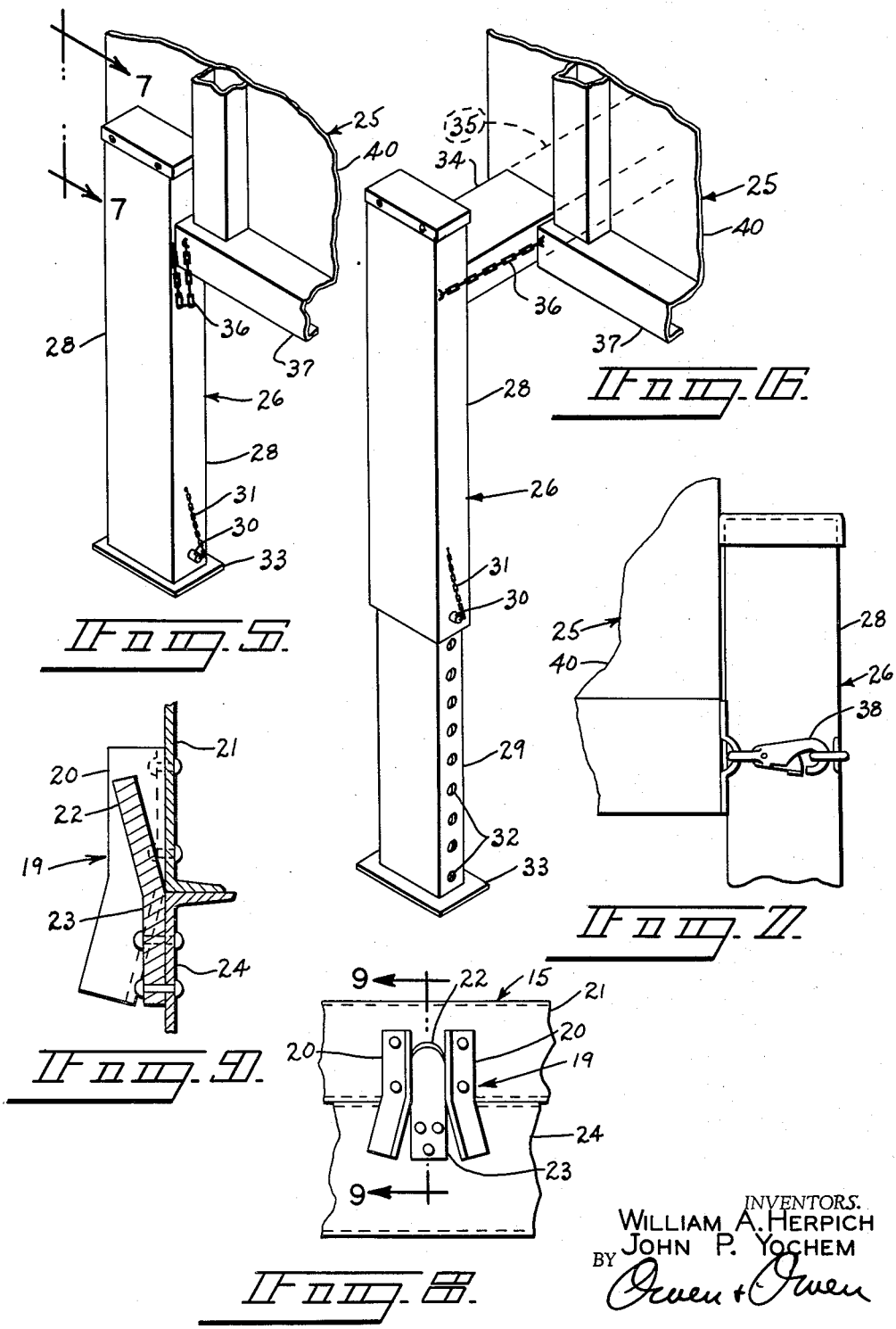

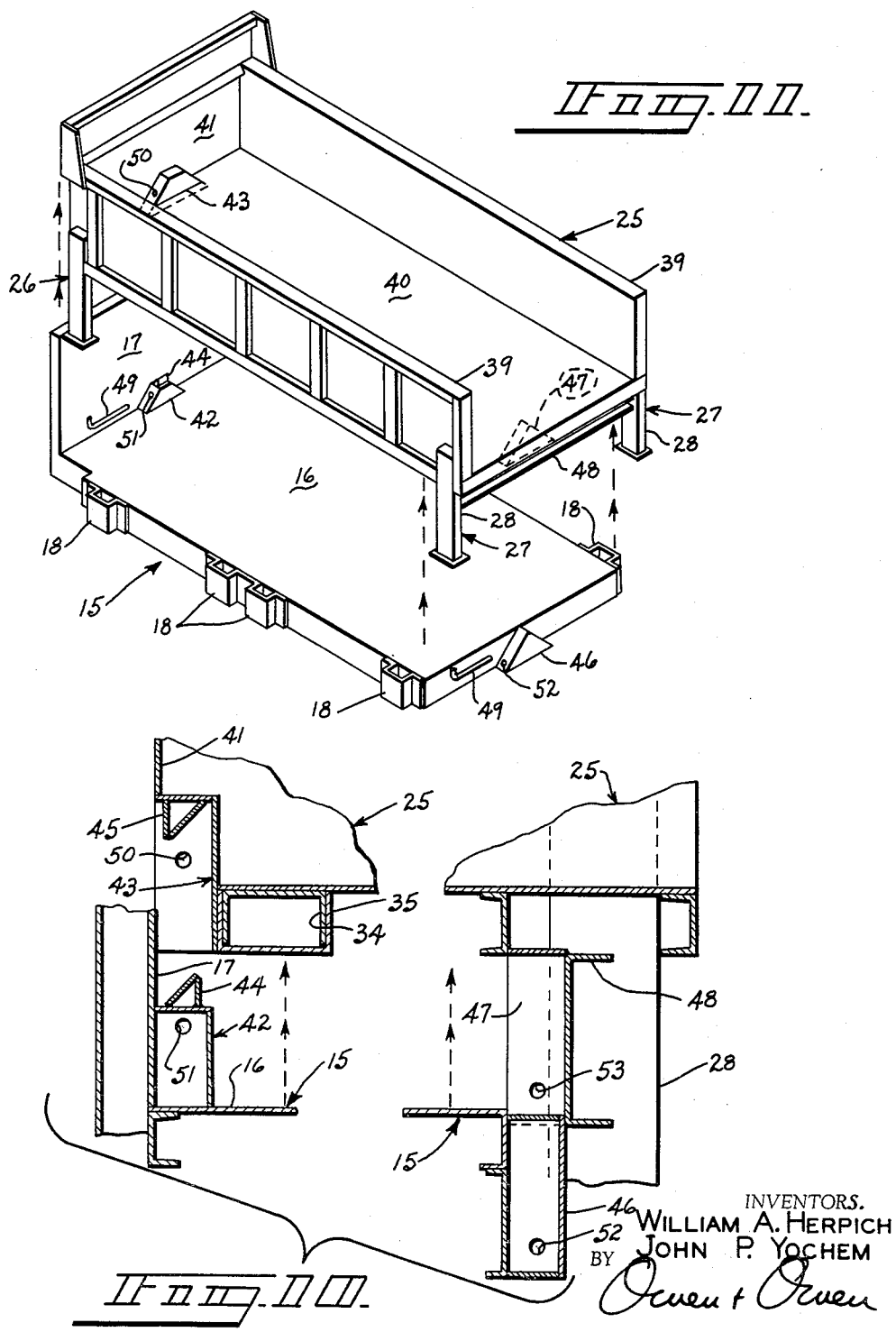

United States Patent Office 3,119,503
Patented Jan. 28, 1964

3,119,503
MOTOR VEHICLE WITH PERMANENT AND SET-OFF BODIES
William A. Herpich and John P. Yochem, Galion, Ohio, assignors to Hercules Galion Products, Inc., Galion, Ohio, a corporation of Delaware
Filed Aug. 27, 1962, Ser. No. 219,570
1 Claim. (Cl. 214—512)

This invention relates to a motor vehicle having both a permanent and a set-off body and particularly to cooperative means on the vehicle and on the bodies by which the vehicle may be used with or without the set-off body and which means cooperate for retaining and positioning the set-off body on the vehicle when it is used.

Set-off bodies for heavy duty trucks have been developed so that the main truck chassis with the motor and cab are not required to remain at the place where the body is left, for example, during loading or unloading. Thus, a body filled with material may be delivered to an unloading site, separated from the truck chassis and "set-off" at the unloading site, while the truck chassis proceeds with a further trip, or in the case of a combination embodying the invention, the permanent truck body may be utilized for the purpose of carrying other materials or objects.

It is the principal object of the present invention to provide an automotive truck having a body or platform which is a permanent part of the truck but which may be raised and lowered to facilitate the positioning and "setting off" of an auxiliary body when desired.

It is yet another object of the instant invention to provide a truck having a permanent body or platform and a "set-off" body, the two being provided with means for readily positioning and locking the set-off body onto the permanent body.

It is yet another object of the instant invention to provide a truck chassis and permanent body structure movable relative to each other for the purpose of facilitating the positioning and removal of a set-off body when desired.

These and other objects and advantages of a motor vehicle having a permanent body or platform and a set-off body and embodying the invention, will be better understood from the specification which follows and from the drawings, in which:

FIG. 5 is a fragmentary view in perspective of a support leg for a set-off body in its telescoped and inner position, being shown on an enlarged scale;

FIG. 6 is a view similar to FIG. 5 and showing the leg in its extended and outer position;

FIG. 7 is a fragmentary view in elevation and on a still larger scale, taken from the position indicated by the line 7—7 of FIG. 5;

FIG. 8 is a fragmentary view in elevation of means for aligning the permanent body with the truck chassis;

FIG. 9 is a fragmentary vertical sectional view taken along the line 9—9 of FIG. 8 and shown on a further enlarged scale;

FIG. 10 is a fragmentary vertical sectional view taken along the longitudinal center line of the permanent and set-off bodies and illustrating particularly the cooperation of positioning and locking means; and FIG. 11 is a somewhat schematic view in perspective illustrating how the permanent and set-off bodies are aligned, positioned and locked together.

A truck having a set-off body according to the invention may comprise a conventional chassis generally indicated at 10 and provided with suitable ground engaging wheels 11 and a cab and engine generally indicated at 12 by which the truck is powered. At the front and back of each side of the chassis 10 there is povided one of four vertically oriented lifting cylinders 13, the pistons of which are attached to the underside of side frames 14 of a permanent truck body or platform generally indicated at 15.

Figure 3:
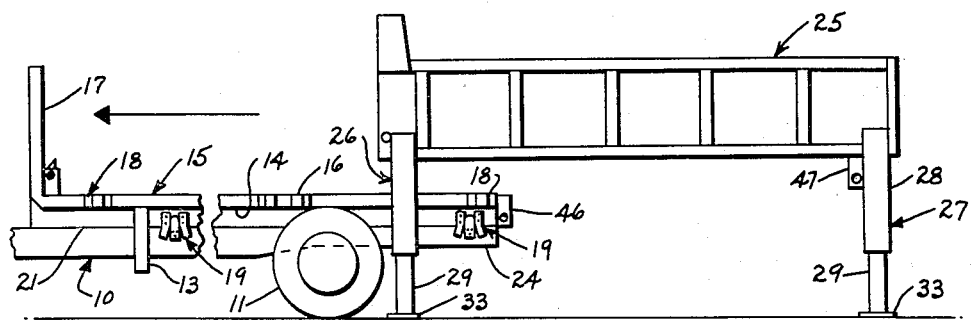
FIG. 3 is a view similar to FIGS. 1 and 2 but showing the set-off body positioned on the ground and the truck and its permanent body departing therefrom.

As can best be seen by reference to FIGS. 3 and 11 the permanent truck body or platform 15 illustrated has a flat bed 16 and a front wall 17. The flat bed and front wall 17 may be utilized in their lowered position (FIG. 3) as an independent truck body, for example for the cartage of heavy machinery or bulky supplies and may be provided with suitable stake holding means 18 to function as a stake truck.

The platform body 15 is guided for proper nesting onto the chassis 10 and retained against shifting thereon by cooperating guides 19 (see also FIGS. 8 and 9). Each of the guides 19 comprises a pair of flared channels 20, in this instance riveted to main frames 21 of the body 15 and directed downwardly, the channels 20 being spaced from each other a distance sufficient to receive a tongue 22 bent upwardly and outwardly from a center guide 23 which is riveted to the outer side of a side frame 24 of the chassis 10. The snug entry of the tongue 22 between the webs of the channels 20 as the body 15 is moved downwardly by retraction of the pistons of the cylinders 13, both guides the body 15 into its correct position and binds it against lateral shifting on the chassis 10. This relieves the cylinders 13 and their pistons from any shearing force which might result from the tendency of the body 15 and the load carried thereon to shift relative to the chassis 10.

Figure 1:
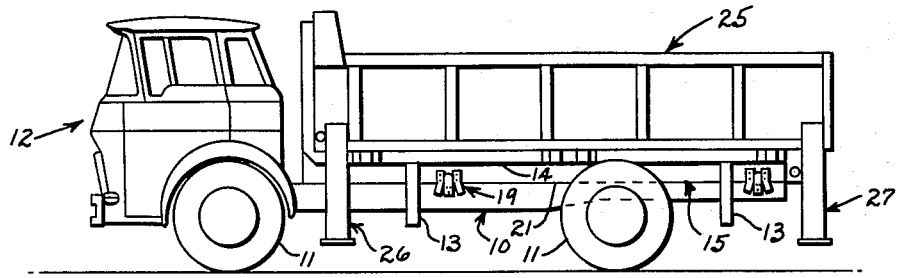
FIG. 1 is a side view in elevation of a truck and body combination embodying the invention and showing a set-off body in carrying position on the truck.
Figure 2:
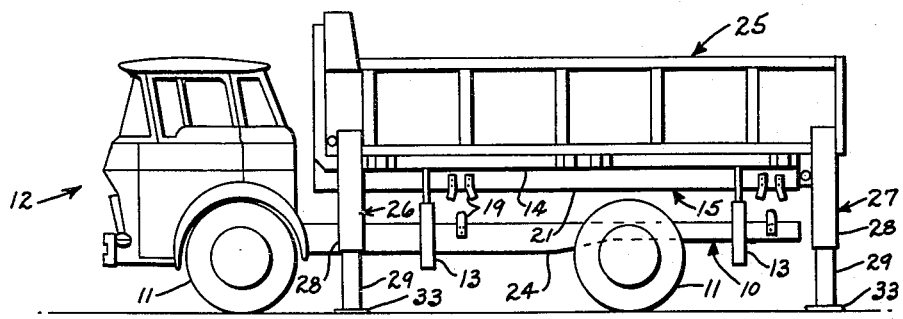
FIG. 2 is a view similar to FIG. 1 but showing the set-off body supported by suitable means on the ground and the permanent truck body elevated into position to facilitate setting off the removable set-off body.

In the embodiment of the invention illustrated in the drawings a set-off body, generally indicated by the reference number 25 is illustrated in several of its positions relative to the permanent body 15. In FIG. 1 the set-off body 25 is shown in road position, resting upon and locked to the permanent body 15. In FIG. 2 the set-off body 25 is shown in elevated position, having been lifted by extension of the cylinders 13 which lifts the permanent body 15 upon which the set-off body 25 still is resting. In this position, two extensible support legs 26 at the front, and two legs 27 at the rear, are extended downwardly into contact with the ground and locked in place in order to support the weight of the set-off body 25. In FIG. 3 the set-off body 25 is shown supported on the legs 26 and 27 with the truck being driven away from beneath the body 25.

The set-off body 25, as mentioned, has four extensible, telescoping legs 26 and 27, the legs 26 also being laterally movable from an inner position (FIG. 5) to an outer position (FIG. 6). Each of the legs 26 and 27 comprises an outer box channel guide 28 and an inner box channel strut 29. The guides 28 and struts 29 may be telescoped into a closed position illustrated in FIG. 5 or extended to a supporting position illustrated in FIG. 6. Each of the legs 26 and 27 has a locking pin 30, illustrated as being restrained by a chain 31, and which is insertable through the wall of the guide 28 into any one of a series of holes 32 in the strut 29 (FIG. 6) or a similar hole (not shown) near the top of the strut 29. When the legs 26 and 27 are in their telescoped or retracted position (FIGS. 1 and 5) they are elevated above the ground a distance to clear obstructions normally to be encountered. When the legs 26 and 27 are extended (FIGS. 2, 3, 4 and 6) pads 33 rest on the ground to spread the weight of the body 25 supported thereby. The series of holes 32 provides for the extension of the legs 26 and 27 to varying distances to compensate for uneven terrain.

Figure 4:
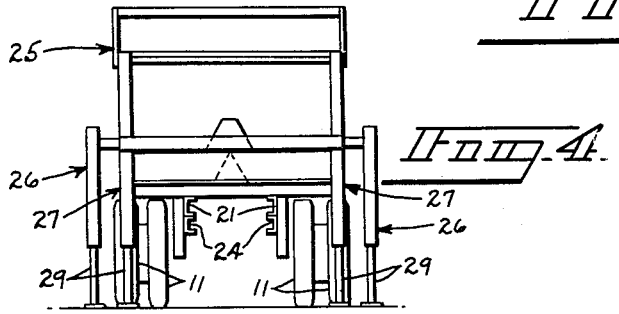
FIG. 4 is an end view in elevation taken from the right side of FIG. 2.

The front legs 26 are also laterally shiftable from the inner, travelling position illustrated in FIG. 5 to the position illustrated in FIG. 6 in order to space them a greater distance from each other so that the rear wheels of the vehicle may be driven outwardly from between the leg 26. FIG. 4 illustrates this lateral spacing and a comparison between FIGS. 5 and 6 demonstrates how the legs are guided for this movement. Each of the guides 28 of the legs 26 is rigidly mounted on the outer end of a horizontally extending support member 34 (see also FIG. 10) which slides in a way 35 provided at the front lower corner of the body 25. A limit chain 36 is connected between a side channel 37 of the body 25 and the guide 28 to limit the outward movement of the leg 26. During road travel each of the legs 26 is retained in its inner position by a snap latch 38 (FIG. 7) or similar means engaged between the body 25 and the leg 26.

In the embodiment of the invention shown in the drawings, the set-off body 25 is illustrated as an open top, bulk carrier having side walls 39, a bed 40 and a front wall 41, the entire structure being heavily braced and rigidly constructed from heavy sheet steel with appropriate girder bracing. It will be appreciated that no matter what type of set-off body is provided with mechanism according to the invention for the purposes described, it must be relatively rigid and sturdy in order that the legs 26 and 27 will not be deformed or bent in normal usage and will not collapse when the body 25 with its cargo is supported thereon as illustrated in FIG. 3.

In addition to providing for the setting off of the body 25 from the permanent body 15 in the manner described, the structure embodying the invention also comprises means for guiding the set-off body 25 and permanent body 15 into proper nesting relationship and for locking the two bodies to each other during road travel. These means are best illustrated in FIGS. 10 and 11. At the front of the permanent body 15, at the center of the junction between its bed 16 and front wall 17 there is positioned a truncated triangular guide 42 of such size and shape as to nest in the interior of a similar truncated triangular guide 43 that is rigidly positioned at the front center of the front wall 41 of the set-off body 25. The guide 43 protrudes upwardly above the level of the bed 40 of the body 25 and is open at its bottom and front sides so as to provide for the entry thereinto of the guide 42 by a simultaneous vertical and horizontal movement.

When the set-off body 25 is positioned on its support legs (FIG. 3) the truck operator backs the truck and the permanent body 15 into position beneath the set-off body 25 aligning the two as nearly as possible. He then actuates the mechanism to extend the pistons of the cylinders 13, slowly lifting the permanent body 15 upwardly into engagement beneath the set-off body 25. The side walls of the guide 42 engage the mating inclined side walls of the guide 43 to laterally align the two bodies 25 and 15 at their front ends.

The guide 42 also has a longitudinal guide and wedge 44 which is triangular in cross section and extends transversely of the guide 42 at its top. The wedge 44 cooperates with an opposed, downwardly directed, similar wedge 45 positioned in the upper part of the interior of the guide 43. As can best be seen by reference to FIG. 10, when the permanent body 15 is raised by the extension of the cylinders 13, the two inclined faces of the wedges 44 and 45 engage each other to shift the permanent body 25 forwardly, if necessary, and after engagement, to prevent the rearward movement of the set-off body 25 relative to the permanent body 15. The front side of the front wall 41 of the set-off body 25 engages the back side of the front wall 17 of the permanent body 15.

At the rear of the permanent body 15 and of the set-off body 25 there are provided cooperating guides 46 and 47, similar to the guides 42 and 43, except that the guides 46 and 47 do not have the cooperating wedges 44 and 45. The guide 46 is rigidly welded or otherwise secured at the rear of the permanent body 15 and the guide 47 is rigidly welded or otherwise secured to a main rear cross member of the frame of the set-off body 25 and may also be braced by being welded, for example, to a heavy crossbeam 48 at the rear lower edge of the set-off body 25 which braces the guides 28 of the rear legs 27.

The set-off body 25 may be locked to the permanent body 15 by inserting locking pins 49 through a hole 50 (FIG. 11) in the portion of the guide 43 which extends above the bed 40 of the set-off body 25 and then through aligned holes 51 in the side walls of the guide 42. Similarly, a second locking pin 49 may be inserted through a hole 52 in the guide 46 and through aligned holes 53 in the guide 47.

When a truck driver moves a vehicle embodying the invention to a position where it is desired to set off a body 25, he first actuates the mechanism to extend the pistons of the cylinders 13 to a height slightly above that shown in FIG. 2. He then disengages the latches 38 and slides the front legs 26 to their outer position (FIG. 6). He then disengages the locking pins 30 in all of the legs 26 and 27 allowing gravity to drop their struts 29 to their lower positions. He then reinserts the pins 30, locking the legs 26 and 27 in these lower positions. The operator then disengages the locking pins 49 from the two sets of body guides 42—43 and 46—47 and then lowers the permanent body 15 dropping the set-off body 25 onto its legs and finally returning the permanent body 15 to its road position (FIG. 3) and driving the truck away, leaving the set-off body 25 in the desired position. Material in the set-off body 25 may then be unloaded at leisure or new material loaded thereinto and the same or another truck operator returns at a later time, reversing the steps just outlined to once again mount the set-off body 25 on the truck for travel.

Having described our invention, we claim:

In a vehicle of the class described having a chassis and a set-off body equipped with extensible support legs, the improvement comprising an elevator body mounted on said chassis, power means for elevating said body relative to said chassis, and cooperating vertical guide channels on said chassis and on said elevator body for guiding said elevator body into position on said chassis and retaining said elevator body against lateral shifting relative to said chassis, cooperating guide means on said elevator body and said set-off body, said guide means consisting of a pair of mating, vertically engageable and disengageable wedge means having laterally inclined surfaces at each of the front and rear ends of said bodies, at least one pair of similar mating wedge means having longitudinally inclined surfaces and means for locking said wedges in engaged mated positions for retaining said set-off body on said elevator body, wedge means on said elevator body extending upwardly and the wedge means on said lift-off body having mating recesses open at the bottom and front sides, the front pair of said wedge means extending above the level of the floor of said lift-off body and the rear pair of said wedge means being located beneath said lift-off body at the rear of said elevator body and both of said pairs having laterally aligned locking pin openings therethrough.

References Cited in the file of this patent

UNITED STATES PATENTS

| | | |
|---|---|---|
| 1,425,965 | Hocke | Aug. 15, 1922 |
| 2,129,340 | Webber | Sept. 6, 1938 |
| 2,251,839 | Dondlinger | Aug. 5, 1941 |
| 2,596,838 | Carver et al. | May 13, 1952 |
| 2,670,866 | Glesby | Mar. 2, 1954 |
| 2,750,058 | Burch | June 12, 1956 |
| 2,811,386 | Shaw | Oct. 29, 1957 |
| 2,934,373 | Doty | Apr. 26, 1960 |
| 2,958,538 | Norris et al. | Nov. 1, 1960 |